(12) United States Patent
Siegel et al.

(10) Patent No.: US 10,176,609 B2
(45) Date of Patent: Jan. 8, 2019

(54) ANALYSIS AND VISUALIZATION OF INTERACTION AND INFLUENCE IN A NETWORK

(71) Applicant: Runtime Collective Limited, Brighton (GB)

(72) Inventors: Paul Siegel, New York, NY (US); Nate Walton, New York, NY (US); Sebastian Hempstead, New York, NY (US); Amy Barker, New York, NY (US); Jessica Bowden, Brighton (GB); Dan Neame, Brighton (GB)

(73) Assignee: Runtime Collective Limited, Brighton (GB)

(*) Notice: Subject to any disclaimer, the term of this patent is extended or adjusted under 35 U.S.C. 154(b) by 0 days.

(21) Appl. No.: 15/592,873

(22) Filed: May 11, 2017

(65) Prior Publication Data
US 2017/0330357 A1 Nov. 16, 2017

Related U.S. Application Data

(60) Provisional application No. 62/334,840, filed on May 11, 2016.

(51) Int. Cl.
| | | |
|---|---|---|
| *G06T 11/20* | (2006.01) | |
| *G06F 17/30* | (2006.01) | |
| *G06F 3/0481* | (2013.01) | |

(52) U.S. Cl.
CPC ........ *G06T 11/206* (2013.01); *G06F 3/0481* (2013.01); *G06F 17/30958* (2013.01); *G06F 17/30994* (2013.01); *G06T 2200/24* (2013.01)

(58) Field of Classification Search
CPC .................................................. G06T 11/206
See application file for complete search history.

(56) References Cited

U.S. PATENT DOCUMENTS

| | | | | |
|---|---|---|---|---|
| 5,276,789 A | * | 1/1994 | Besaw ................ | G06F 17/509 345/440 |
| 6,437,804 B1 | * | 8/2002 | Ibe ..................... | G06F 17/509 709/223 |
| 8,775,517 B1 | * | 7/2014 | Goldman ............ | G06Q 50/01 705/319 |
| 2005/0120105 A1 | * | 6/2005 | Popescu .............. | H04L 41/00 709/223 |

(Continued)

OTHER PUBLICATIONS

Andersen et al., Local Graph Partitioning using PageRank Vectors. FOCS '06 Proceedings of the 47th Annual IEEE Symposium on Foundations of Computer Science. Oct. 21-24, 2006. pp. 475-486.

(Continued)

*Primary Examiner* — Ryan McCulley
(74) *Attorney, Agent, or Firm* — Mintz Levin Cohn Ferris Glovsky and Popeo, P.C.

(57) ABSTRACT

Data is received characterizing a network represented by a directed graph having nodes and edges. The network includes an influence score associated with a node. The network is associated with a search keyword. A portion of the directed graph and influence score is displayed in a graphical user interface display space. The portion of directed graph is dynamically updated in response to receiving updated network data. Related apparatus, systems, techniques and articles are also described.

20 Claims, 13 Drawing Sheets

(56) References Cited

U.S. PATENT DOCUMENTS

| | | | | |
|---|---|---|---|---|
| 2008/0215590 A1* | 9/2008 | Thai | | G06F 17/30864 |
| 2010/0075701 A1* | 3/2010 | Shang | | G06Q 30/02 |
| | | | | 455/466 |
| 2010/0161662 A1* | 6/2010 | Jonas | | G06F 17/30539 |
| | | | | 707/780 |
| 2013/0007151 A1* | 1/2013 | Chen | | H04L 63/1416 |
| | | | | 709/206 |
| 2013/0212479 A1* | 8/2013 | Willis | | G06Q 10/10 |
| | | | | 715/736 |
| 2014/0143249 A1* | 5/2014 | Cazzanti | | G06F 17/30705 |
| | | | | 707/737 |
| 2014/0218383 A1* | 8/2014 | Srivastava | | G06T 11/206 |
| | | | | 345/589 |
| 2015/0120713 A1* | 4/2015 | Kim | | G06F 17/3053 |
| | | | | 707/723 |
| 2015/0120717 A1* | 4/2015 | Kim | | G06F 17/30699 |
| | | | | 707/727 |
| 2015/0348123 A1* | 12/2015 | Darwin | | G06Q 30/0269 |
| | | | | 705/14.66 |
| 2016/0035046 A1* | 2/2016 | Gupta | | G06Q 50/01 |
| | | | | 705/7.29 |
| 2016/0071162 A1* | 3/2016 | Ogawa | | G06Q 30/0269 |
| | | | | 705/14.66 |
| 2016/0191447 A1* | 6/2016 | Firat | | H04L 51/32 |
| | | | | 709/204 |
| 2016/0283884 A1* | 9/2016 | Wilson | | G06Q 10/06393 |
| 2016/0299976 A1* | 10/2016 | Brunn | | G06Q 50/01 |
| 2017/0109360 A1* | 4/2017 | Hill | | G06F 17/3079 |
| 2017/0169455 A1* | 6/2017 | Dhawan | | G06Q 30/0205 |
| 2017/0178157 A1* | 6/2017 | Jayaram | | G06Q 30/0202 |

OTHER PUBLICATIONS

Chen et al., Scalable Influence Maximization in Social Networks under the Linear Threshold Model. ICDM '10 Proceedings of the 2010 IEEE International Conference on Data Mining. Dec. 13-17, 2010. pp. 88-97.

* cited by examiner

ANALYSIS AND VISUALIZATION OF INTERACTION AND INFLUENCE IN A NETWORK

RELATED APPLICATIONS

This application claims priority under 35 U.S.C. § 119(e) to U.S. Provisional Patent Application No. 62/334,840 filed May 11, 2016, the entire contents of which is hereby expressly incorporated by reference herein.

TECHNICAL FIELD

The subject matter described herein relates to modeling, prediction, and contextual visualization of interactions and/or influence within communities of social media users.

BACKGROUND

Marketing describes communication between a company and the consumer audience. Marketing is the adaptation of commercial activities and use of institutions by organizations with a purpose to induce behavioral change.

The rise of social networks, in which peers directly communicate with one another (e.g., a peer-to-peer social network), presents new marketing opportunities. But social networks can include vast amounts of data that cannot be easily analyzed or visualized. Moreover, social networks are constantly in flux, with new interactions occurring and communities changing over even a short period of time further complicating network analysis.

SUMMARY

The current subject matter provides estimation and visualization of interactions and/or influence in a peer-to-peer social network. Influence of a peer in a peer-to-peer social network can include a likelihood that a given peer can broadcast a message and persuade other peers. Moreover, in some implementations, the current subject matter allows for dynamic analysis and visualization to reflect changes in influence, conversations, and communities dynamically and over time.

In an aspect, data is received characterizing a network represented by a directed graph having nodes and edges. The network includes an influence score associated with a node. The network is associated with a search keyword. A portion of the directed graph and influence score is displayed in a graphical user interface display space. The portion of directed graph is dynamically updated in response to receiving updated network data.

One or more of the following features can be included in any feasible combination. For example, the influence score can be a likelihood that the node can publish a message and persuade other peers. The influence score can be determined. Clusters of nodes can be determined from the directed graph and based on the influence score. The clusters of nodes can include subsets of the nodes within the directed graph. A relative importance of the determined clusters can be determined. The determined clusters of nodes can be displayed in the graphical user interface display space and in an order based on the determined relative importance.

The influence score can be determined. Determining of the influence score can include assigning the edges in the directed graph a respective initial weight, determining a total outgoing edge weight for a node in the directed graph by at least adding initial edge weights for all outgoing edges for the node, and determining the influence score by at least dividing a weight of each incoming edge by the total outgoing edge weight of the node and summing over all incoming edges.

The determining of clusters of nodes from the directed graph can include determining a set of pre-clusters for each node in the directed graph, the set of pre-clusters for a given node including source nodes associated with each incoming edge of the given node; and determining the clusters of nodes as pre-clusters having an overlap that exceeds a predefined threshold, the overlap being a number of nodes shared in common between pre-clusters.

Ranked features of nodes can be displayed. Nodes in the directed graph can be associated with features. Determining the ranked features can include determining, for each cluster, a set of nodes within the cluster that are associated with the feature; determining, for each cluster, a feature overlap size based on an intersection between the determined set of nodes associated with the feature and the cluster; determining, for each cluster, a cluster overlap score as the determined feature overlap size divided by a size of the cluster; determining a difference between a largest determined cluster overlap score and a smallest cluster overlap score; and ranking features by the difference multiplied by a number of nodes associated with the feature. The feature can include a predefined attribute including gender, interests, profession, topic, hashtag, and/or category.

The portion of the directed graph can be displayed with color coded nodes, the color coding user selectable; and the portions of the direct graph can be displayed with color coding according to a relative influence score.

The nodes can be displayed as circular graphical elements and the edges are displayed as line segments. A conversation can be determined as a grouping of associated nodes within the directed graph. Topics of social interactions can be displayed between nodes in the directed graph according to a relative importance.

The display can be updated periodically. One or more nodes in the updated network data that was not previously in the displayed portion of the directed graph can be identified using the updated network data. The influence score can be computed for each node in the directed graph by partitioning the network into maximal sets of vertices with a path of edges joining any pair of vertices. All nodes can be determined in the directed graph that have used the search keyword in an interaction. The determined nodes can be displayed.

The computed influence score can be normalized with a conversation volume measure determined according to a sum of degrees of vertices in a component containing a given vertex. A cluster within the directed graph can be determined. The cluster can be a set of nodes with more internal connections than external connections.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides estimation and visualization of interactions and/or influence in a peer-to-peer social network. Influence of a peer in a peer-to-peer social network can include a likelihood that a given peer can broadcast a message and persuade other peers. Moreover, in some implementations, the current subject matter allows for dynamic analysis and visualization to reflect changes in influence, conversations, and communities dynamically and over time.

Figure 1:
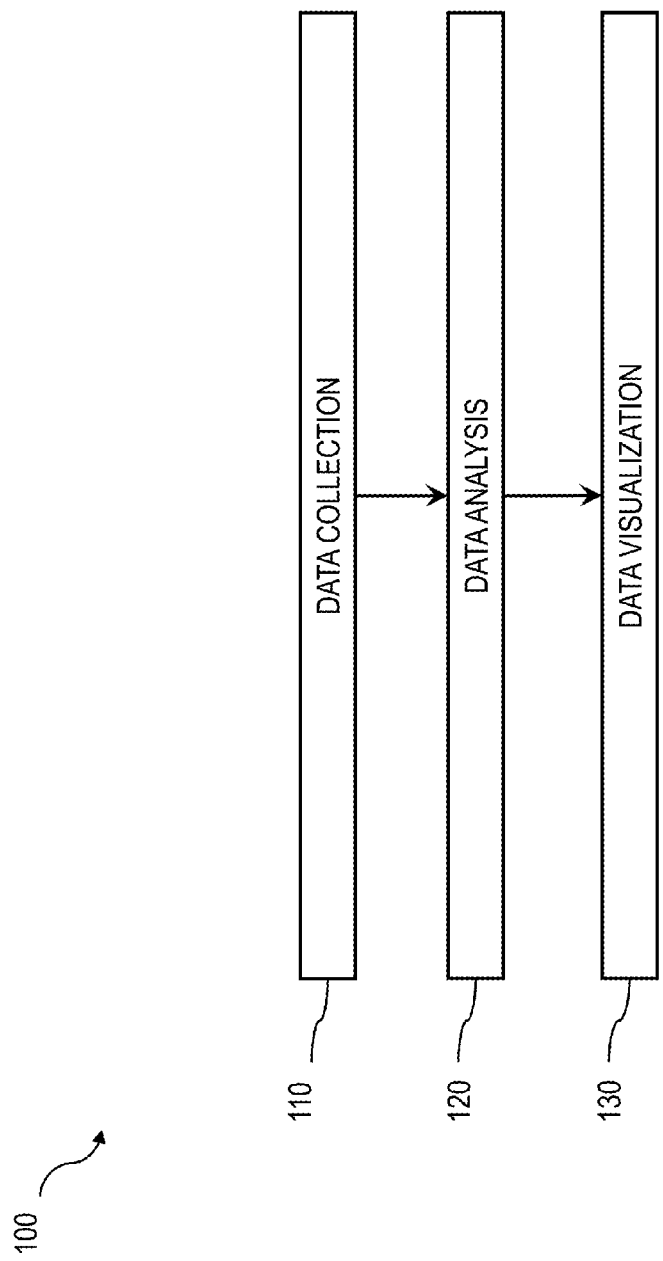
FIG. 1 is a process flow diagram illustrating a process of collecting social media data, analyzing the data, and visualizing influence.
Figure 2:
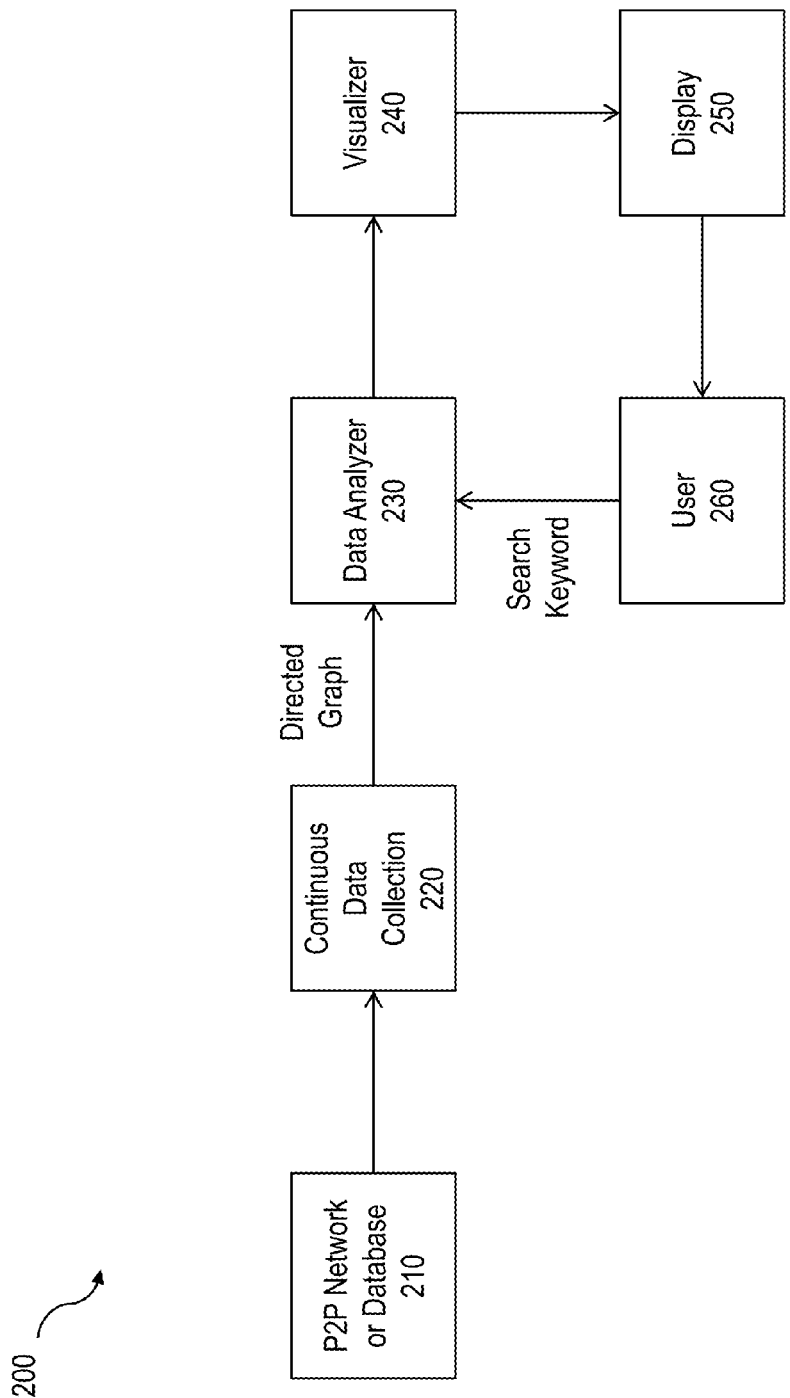
FIG. 2 is a system block diagram illustrating an example system implementing the process illustrated in FIG. 1.

FIG. 1 is a process flow diagram illustrating a process 100 of collecting social network data and visualizing influence within the social network. FIG. 2 is a system block diagram illustrating an example system 200 implementing the process 100 illustrated in FIG. 1. With reference to FIGS. 1 and 2, at 110, social media data can be collected by continuous data collection module 220. Social network data can relate to any social network which admits direct peer-to-peer interactions. Social network data can be collected directly from a social media network 210 (e.g., using an application programming interface (API)) and/or from a database of social media network data. In one example implementation, the social media network is TWITTER®, although other networks are possible such as FACEBOOK®, INSTAGRAM®, and the like.

Continuous data collection module 220 can take raw social network data and form a network represented as a weighted directed graph having nodes, edges, and edge weights. In the example implementation, the network can be constructed from a collection of tweets retrieved from TWITTER's® public search API, but in some implementations the tweets can be accessed from a database or from another source.

Figure 3:
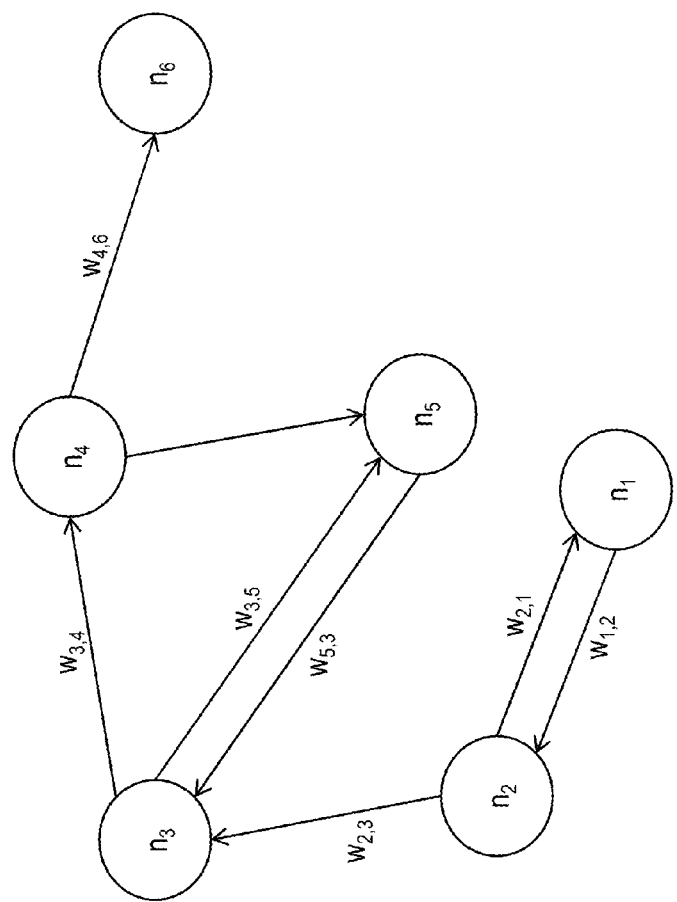
FIG. 3 illustrates an example weighted directed graph.

An example weighted directed graph 300, which can be output from the continuous data collection module 220, is illustrated in FIG. 3. The weighted directed graph 300 includes nodes $n_i$, edges (illustrated as directed line segments), and edge weights $w_{i,j}$. The nodes $n_i$ can represent all users (for example, TWITTER® accounts) involved in interactions as either the source or target of an interaction. The edges can represent one or more interactions between users, and the edge's weight $w_{i,j}$ can represent a measure of importance of the interactions, such as the number of interactions.

Figure 4:
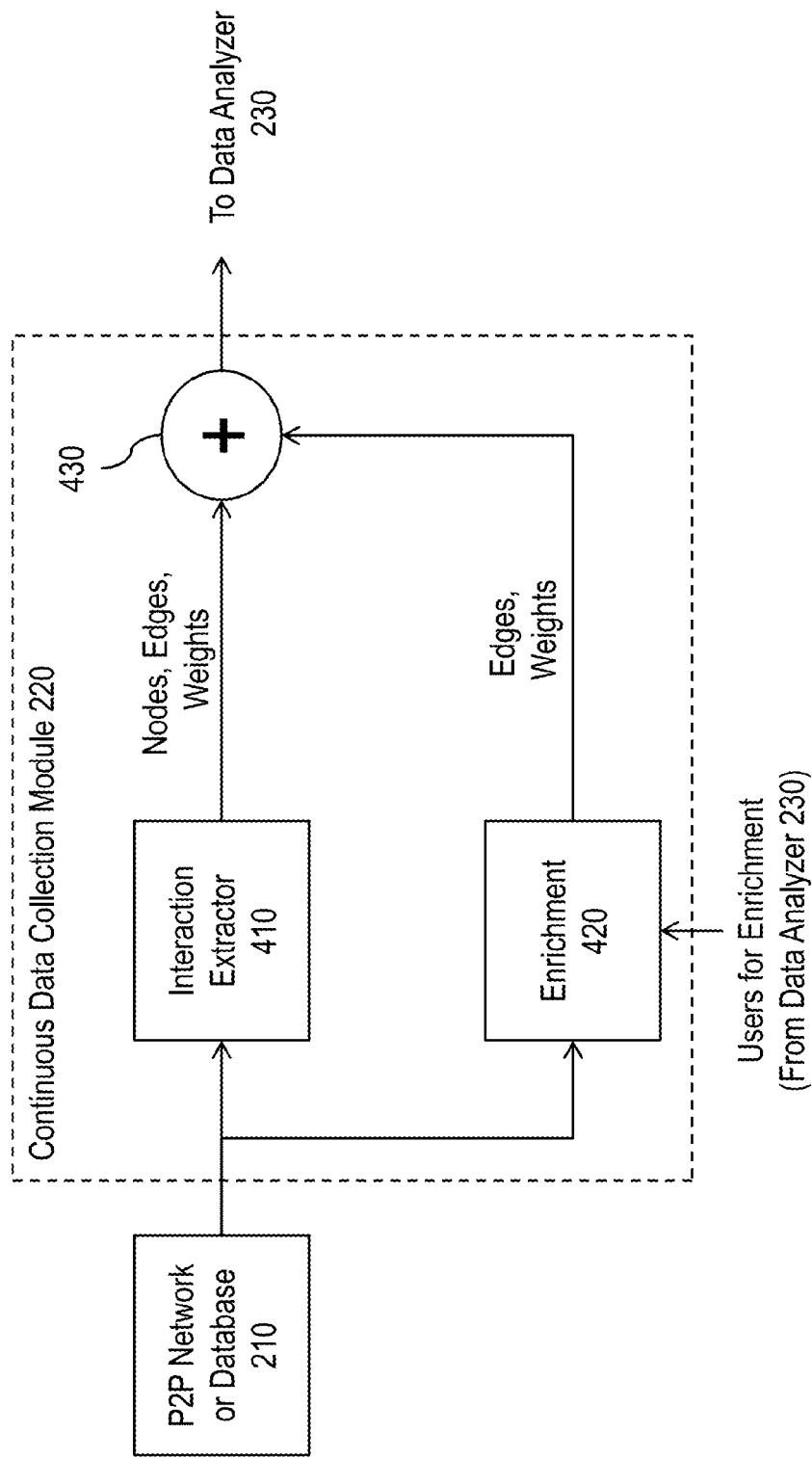
FIG. 4 is a system block diagram illustrating an example implementation of the continuous data collection module.

FIG. 4 is a system block diagram illustrating an example implementation of the continuous data collection module 220. The continuous data collection module 220 includes an interaction extractor 410, and an enrichment module 420. The interaction extractor 410 receives the raw social network data from the peer-to-peer network or database 210 and extracts interactions from the raw social network data. For example, from a collection of tweets (e.g., raw social network data), interactions can be extracted, which, for example, can be defined to be any @ mention (including retweets and replies) from a TWITTER® user X (e.g., the "source") to a TWITTER® user Y (e.g., the "target"). The nodes $n_i$ in the network include all TWITTER® users which appear either as the source or the target in an interaction, and an edge exists from node X to node Y whenever there is an interaction directed from X to Y in the collection (e.g., X authors a tweet which @ mentions Y). The edges can be weighted $w_{i,j}$ as described below.

Part of the data collection process can include "enrichment," in which additional information is used to find additional edges. In an example, certain users' timelines can be searched for additional edges (but not nodes) to obtain more comprehensive interaction data. In some implementations, any user-level data can be used for enrichment. For example, metadata like interests, profession, gender, and the like may be used. Enrichment module 420 can receive a user (or node) identifier as input from the data analyzer 230 and can search for additional edges to obtain more comprehensive interaction data. Thus, in the example implementation, if the original collection of tweets corresponds to a keyword search (say, for the keyword "brandwatch") then the nodes in the network represent TWITTER® users who were either the source or the target of an interaction which included the word "brandwatch" but the edges could represent any interaction, including those which don't include the word "brandwatch". Users can be selected for enrichment by the data analyzer 230 according to an influence measure (explained further below). In some implementations, enrichment is not performed.

Interaction extractor 410 can output nodes, edges, and edge weights, which can be merged by combiner 430 with edges and edge weights from enrichment module 420. These nodes, edges, and edge weights can be provided to data analyzer 230.

Continuous data collection module 220 can continually request, receive, and process new raw social network data over time. Continuous data collection can be considered continuous if new raw social network data is received within a time period, such as every 10 minutes, 2 minutes, 1.5 minutes, 1 minute, 30 seconds, 15 seconds, 5 seconds, or 1 second. It is noted that there are limitations imposed by transmission latency and processing time on how quickly the network can be updated. For example, over time, each node $n_i$ will have additional interactions within the social network. These interactions may be with nodes that have already been interacted with (e.g., processed nodes or users). Continuous data collection module 220 can provide updated edges and/or edge weights to data analyzer 230. In some instances, new interactions will be between a previously interacted with node and a node that has not been previously interacted with (and thus not previously processed), in which case continuous data collection module 220 can identify the one or more nodes that have not been previously interacted with or processed.

Referring again to FIGS. 1 and 2, at 120, the network represented as a weighted directed graph can be analyzed by data analyzer 230. Data analyzer 230 can assign to each node in the network a score intended to represent its influence within the network and estimate the likelihood that an arbitrary node in the network will be persuaded by a message broadcast by an input node. The data analyzer 230 may also receive a search keyword from user 260 in order to determine all nodes in the network that have used that keyword in an interaction. The determined nodes may be highlighted/visualized to the user.

Figure 5:
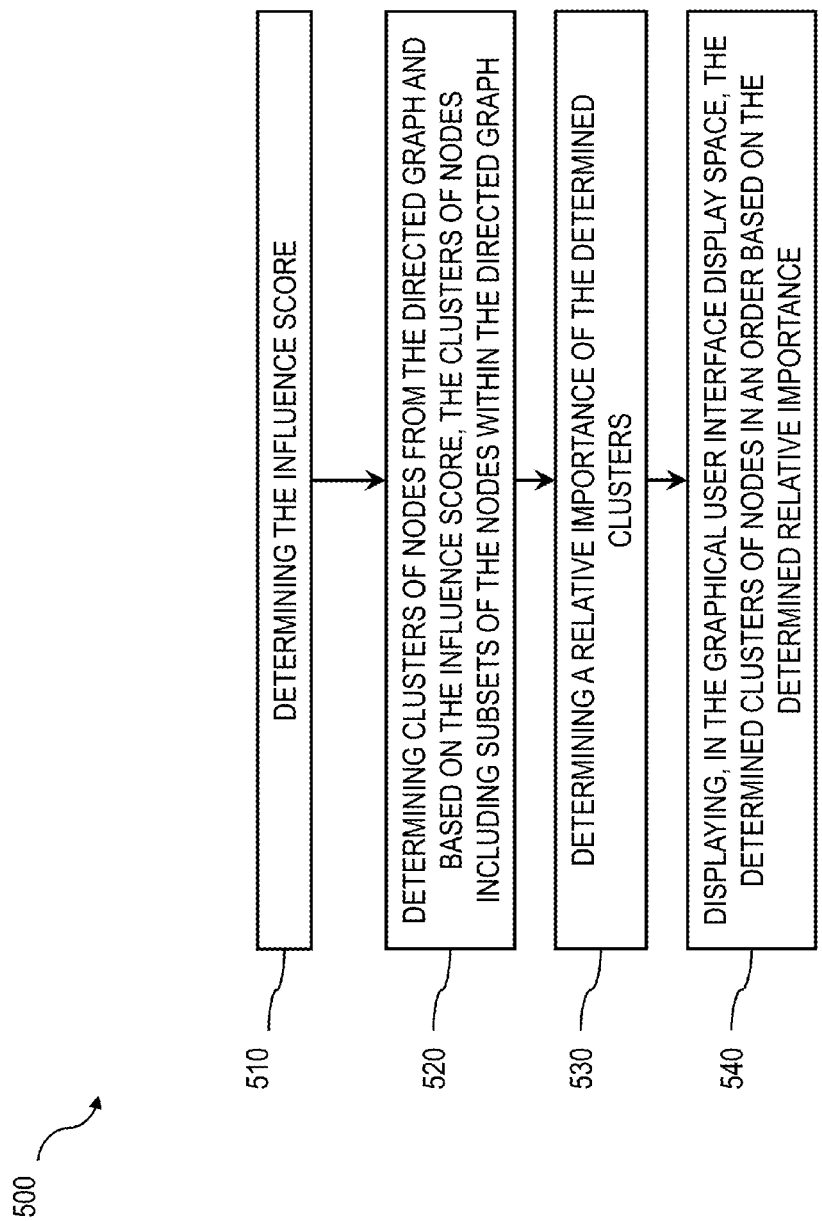
FIG. 5 is a process flow diagram of a process of analyzing network data.

FIG. 5 is a process flow diagram of a process 500 of analyzing network data. The analysis of network data can enable a visualization of the network data that is intuitive and allows for deeper understanding of the dataset.

At 510, a node influence score can be determined. The node influence score can be based on the extent of engagement of the node with other nodes and their scores. Each node in the network can be assigned an influence score intended to represent its influence within the network. For example, each edge in the graph can be given a weight. Each node's (e.g., user's) total outgoing edge weight can be computed by adding the edge weights for all outgoing edges. A measure of each node's (e.g., user's) influence score can be computed by dividing the weight of each incoming edge by the total outgoing edge weight of that edge's source node (e.g., source user), and summing over all incoming edges. A node's influence score may also be referred to as the node's centrality within the network.

With respect to initializing each edge in the graph, the weight can be initialized to one of a number of predetermined values based on a rule. For example, in an implementation for a specific underlying social network, the weight can be initialized as 0.2 by default if a source node (e.g., user) interacts (e.g., retweets) a target node (e.g., target user), and 1 if any other interaction occurred (e.g., an @mention or reply). It has been empirically determined that some user interaction types are stronger predictors of future interaction than other user interaction types. For a particular social network, it has been empirically determined that "@mentioning" or replying is a strong predictor of future interactions (by a factor of about 5 on average) than retweets, which only require a user to click the "retweet" button rather than type out a message.

In some implementations, edge weights can be initialized using a model that is based on the number and type of interactions between each pair of nodes in the network. In some implementations, using predefined or predetermined values is computationally efficient and can achieve similar results.

As a second example of determining an influence score, the influence scores can be computed using an adaptation of the PageRank algorithm. For example, a node is deemed to be highly influential if it is engaged by other influential nodes. In an example implementation, in order to determine influence scores, the network is partitioned into connected components, e.g., maximal sets of vertices with the property that there is a path of (undirected) edges joining any pair of vertices. All connected components whose number of vertices is below a prescribed threshold are discarded and a PageRank vector is computed on each remaining component with a uniform seed distribution and prescribed jumping constant (an example value 0.1 can be used). The final rank of each node can then be obtained by multiplying each PageRank vector by the sum of the degrees of the vertices in its corresponding component.

At 520, clusters within the weighted directed graph can be detected. A "cluster" in a network can be a set of nodes with more internal connections than external connections. A collection of (not necessarily disjoint) clusters in the network can be determined or extracted by computing a set of pre-clusters for each node (e.g., user) of all predecessors (e.g., source nodes for each incoming edge) of that node (e.g., user). The clusters can be determined or formed by combining all pre-clusters whose overlap exceeds a threshold. The threshold may be predefined. For example, the threshold may be predefined as 80%. Overlap can be the number of nodes shared in common between pre-clusters (e.g., the intersection of two pre-cluster sets).

As a second example, a cluster can be detected by taking a set of nodes as input and looking for nodes which are particularly likely to be visited by a short random walk starting at one of the input nodes. For example to determine a cluster:

1. Let S be a set of vertices in a graph.
2. Define the "edge boundary" of S to be the set of all edges with one vertex in S and one vertex not in S.
3. Define the "volume" of S to be the sum of the degrees of the vertices in S.
4. Define the "conductance" of S to be the ratio of the number of edges in the edge boundary of S to the minimum of the volume of S and the volume of the complement of S.
5. For any positive number epsilon, say that S is an epsilon cluster if the conductance of S is smaller than epsilon, where epsilon is a parameter of the partitioning algorithm described in more detail below.

An adaptation of graph partitioning algorithms as described in "Local Graph Partitioning using PageRank Vectors" (Andersen, Chung, and Lang 2006) can be used to find large communities in the network. An example of the partitioning algorithm includes:

1. Begin with an undirected graph and a target conductance epsilon. (Can use the value $$\frac{1}{\sqrt{vol(g)}}$$

as the target conductance.)

2. Compute a PageRank vector whose seed distribution is the uniform distribution on a prescribed set of seed vertices. The seed set of the highest ranked vertex according to the ranking algorithm described above can be used.
3. Order the vertices in the connected component(s) containing the seed vertices so that the f(k)=pagerank $(v_k)$/degree$(v_k)$ is a nonincreasing function of k.
4. For each k, $1<=k<=n$, define $S_k=\{v_1, \ldots, v_k\}$ and compute the conductance of each $S_k$. If there is some k such that the conductance of $S_k$ is smaller than epsilon, record that set, remove it from the graph, and return to step 1. Otherwise, terminate.

At 530, the relative importance of clusters can be determined using the influence score of nodes within the cluster. For example, the relative importance of each cluster can be determined as the sum of the influence score of each cluster. A higher relative influence of a cluster can indicate a higher importance of that cluster.

At 540, the determined clusters of nodes can be displayed in a graphical user interface display space in an order based on the determined relative importance.

In some implementations, the likelihood that an arbitrary node in the network will be persuaded by a message broadcast by the input node can be estimated. Additionally, a small set of nodes with maximal broadcast coverage can be found. This can be implemented using an adaptation of the algorithm in "Scalable Influence Maximization in Social Networks under the Linear Threshold Model" (Chen, Yuan, and Zhang 2010).

In some implementations, the influence scores can be normalized according to "local conversation volume"; this ensures that an influential node in a big conversation has a higher score than an influential node in a small conversation. In an example implementation, conversation volume can be defined or determined as the sum of degrees of vertices in the component the given vertex. In some implementations, normalization is not performed.

The process 500 performed by data analyzer 230 may be continuous and/or regularly updated when additional and/or updated network information is received from continuous data collection module 220. Thus, a new nodes influence and/or the determined influence of one or more known nodes within the network may be dynamically updated.

Referring again to FIGS. 1 and 2, at 130, the determined influence of a given node can be visualized by visualizer 240. Visualizer 240 may render images and graphical user interface (GUI) elements on display 250 for user 260. Visualizer 240 may display visual depictions of the network and the product of some of the analysis described above. In some implementations, positions of nodes for visualization can be computed.

Figure 6:
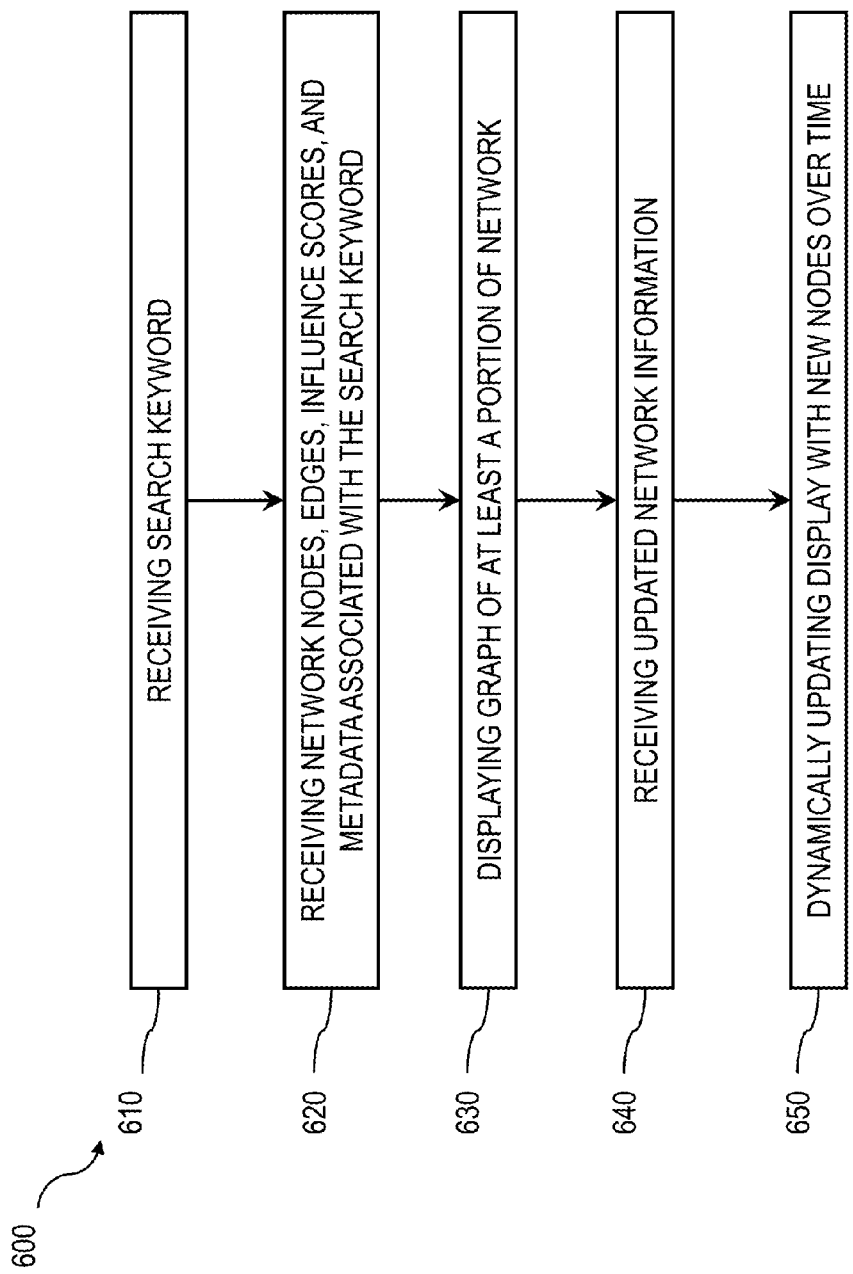
FIG. 6 is a process flow diagram illustrating a method of dynamically updating a display with new nodes and/or updated influence values.

FIG. 6 is a process flow diagram illustrating a method 600 of dynamically updating a display with a visual representation of new nodes and/or updated influence values.

At 610, a search keyword can be received from user 260. In some implementations, the keyword can be received via a web-portal. The keyword may be a simple word or relate to a more complex query. For example, data can be drawn from a social network database query. The social network database query can include complex boolean expressions such as: brandwatch AND ("social media" OR twitter OR facebook OR instagram) NOT ("crimson hexagon" OR netbase OR sprinklr). Other query languages and underlying search/storage implementations are possible enabling the current subject matter to draw from different specific data sources.

At 620, network nodes, edges, influence scores, and any metadata associated with the search keyword can be retrieved. In the example implementation, the metadata can include TWITTER® bios, image uniform resource locators (URLs), profession, interests, gender, sentiment, full text of tweets, tags, categories, hashtags used, and the like. Retrieval may be from a database, storage module, or from the data analyzer 230. The data may be previously filtered or processed to relate to a query and can be combined with results of additional queries. In some implementations, only larger conversations (between at least 10 users) are returned (in other words, all connected components of the graph which do not contain at least 10 nodes can be filtered out). The conversation can be considered large when the number of users in the conversation exceeds a predetermined or user defined threshold.

At 630, a visual representation of the retrieved network data can be displayed (or rendered) on display 250. In an implementation, two visual representations including a global view and a cluster view can be provided. The global view can provide a large-scale overview of the network including number of authors, clusters, and features such as topics. The cluster view can provide clusters ranked according to total influence (e.g., centrality), which can be computed by summing the user-level influence scores describe above. Each cluster can be displayed (e.g., zoomed to) in order and automatically on a periodic basis, such as every 10 seconds. The zoomed view can highlight the top influential users (e.g., top three influential users), and provide a list of top features (e.g., topics), which can be ranked according to a feature selection algorithm described below. In some implementations, user input can cause transition of visualization from cluster-to-cluster.

Figure 11:
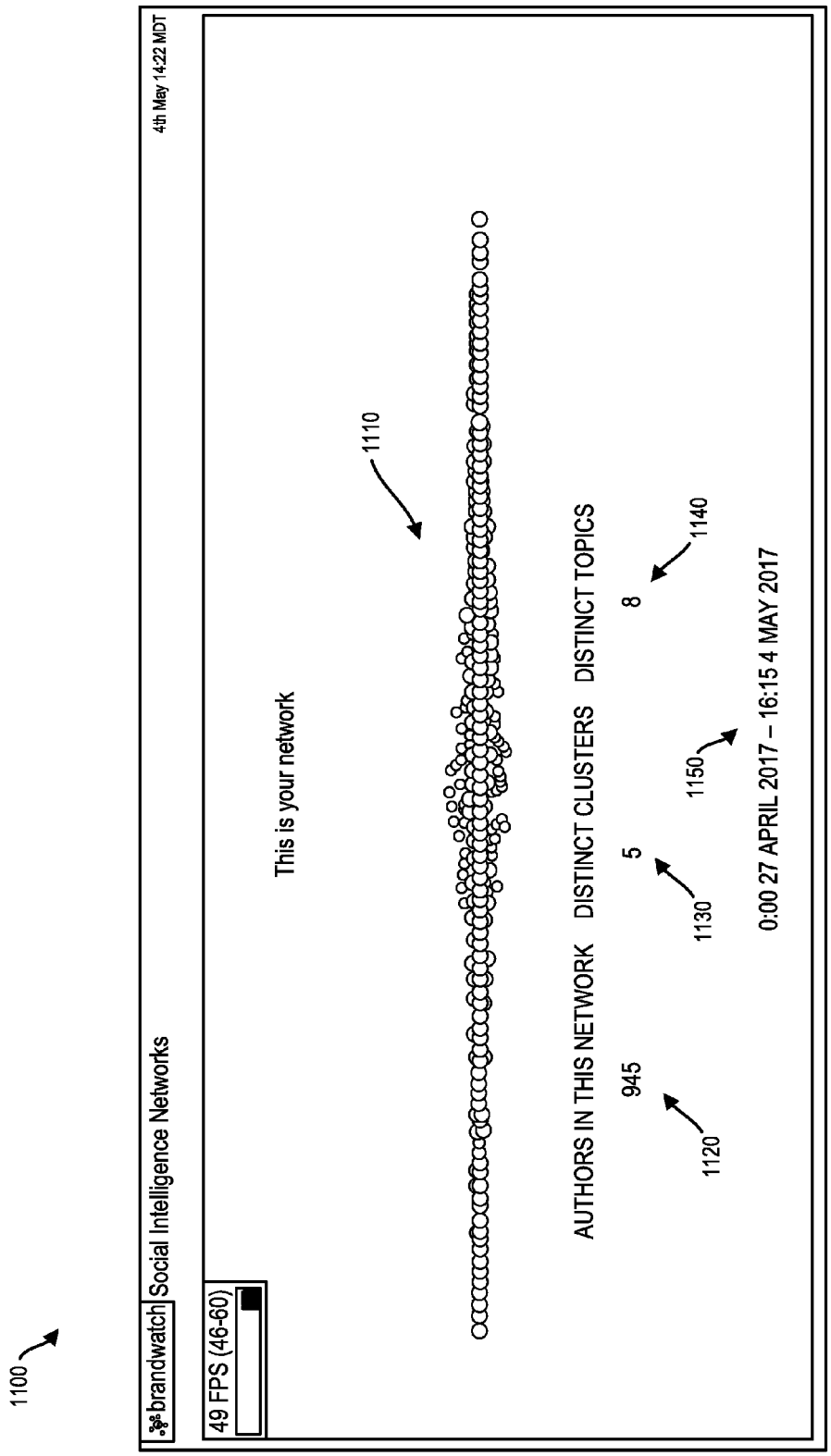
FIG. 11 illustrates an interface including a visualization of a global view of a network showing node influence according to an example implementation of the current subject matter.
Figure 12:
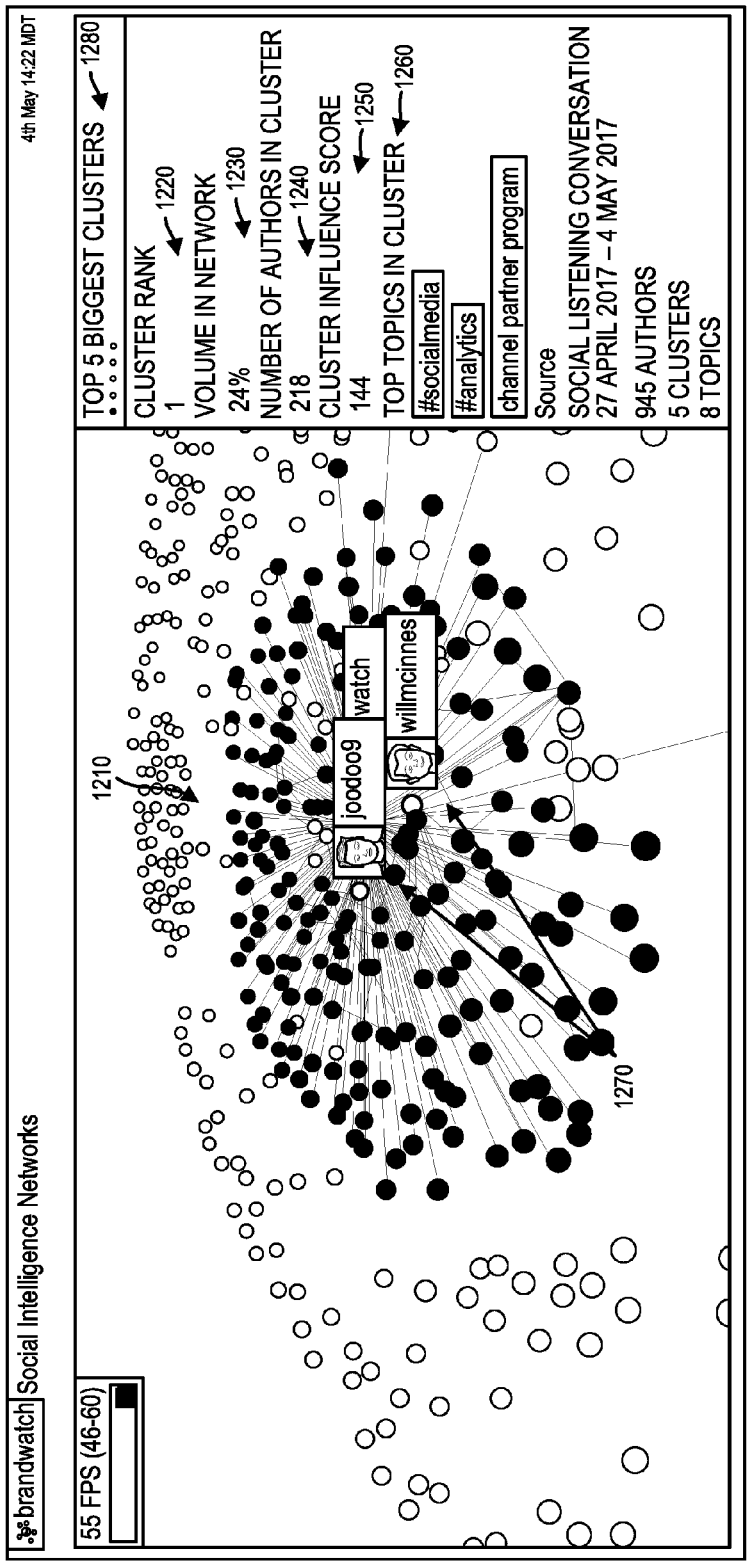
FIG. 12 illustrates interface including an example visualization of a first cluster view of a cluster within a network.
Figure 13:
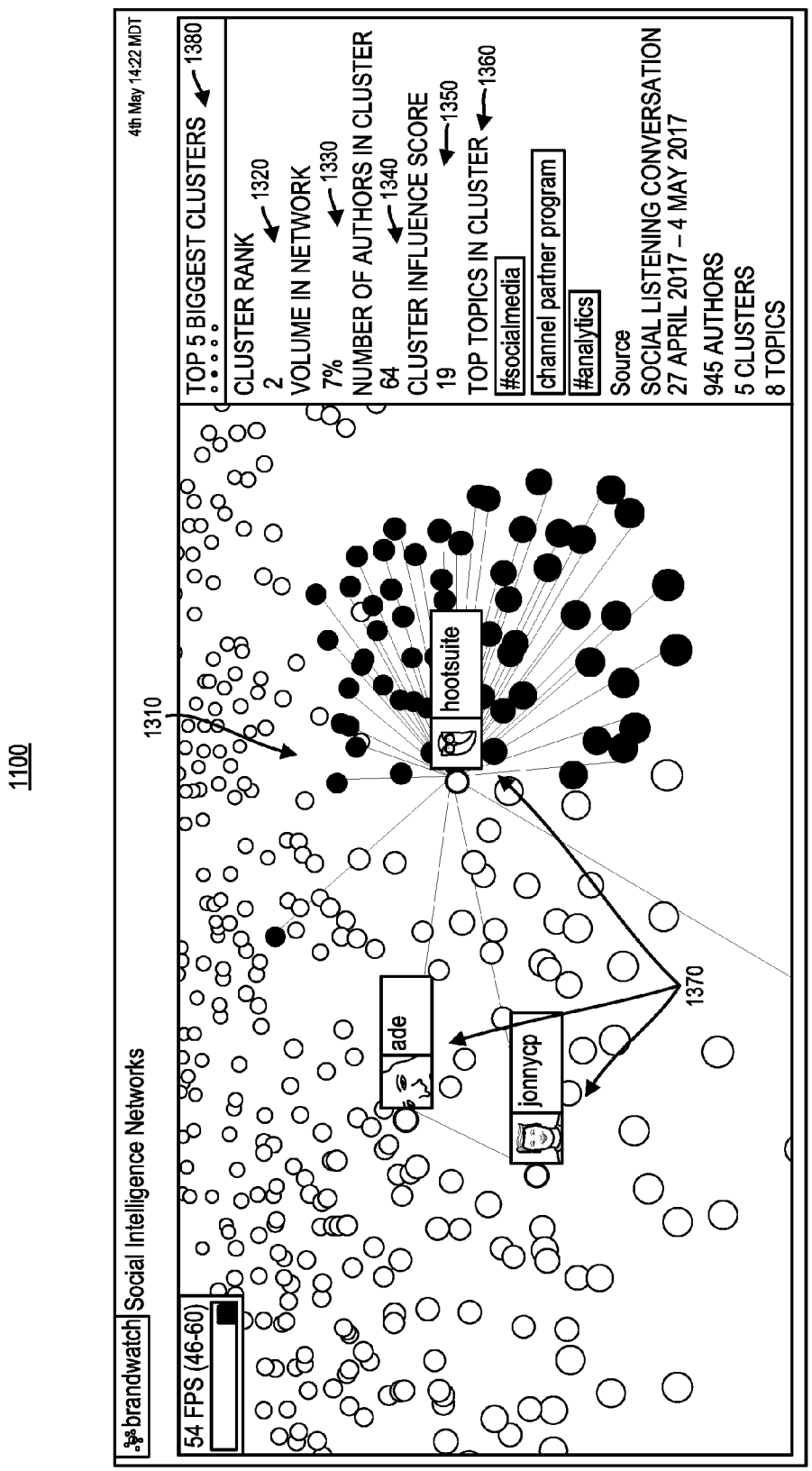
FIG. 13 illustrates interface including an example visualization of a second cluster view of a cluster 1310 within a network.

FIGS. 11-13 illustrate three example interfaces showing visualizations of network data showing global and cluster views. FIG. 11 illustrates an interface 1100 including a visualization of a global view of a network 1110 showing node influence according to an example implementation of the current subject matter. The network 1110 is shown alongside number of authors 1120, number of clusters 1130, and number of topics 1140. A characterization of the dataset 1150 such as a period of time the dataset spans can also be shown.

FIG. 12 illustrates interface 1100 including a visualization of a first cluster view of a cluster 1210 within a network. The cluster 1210 is highlighted and displayed (e.g., zoomed to). The cluster view can include cluster rank 1220, volume in network 1230 (e.g., size of cluster with respect to total network), number of authors in cluster 1240, overall cluster influence score 1250, and top topics in cluster 1260. The list of top topics 1260 can be ranked according to a feature selection algorithm described below. The interface 1200 highlights the top influential users (e.g., top three influential users) as indicated at 1270. A graphical object 1280 is included that illustrates which cluster in the top five clusters is being shown.

Similarly FIG. 13 illustrates interface 1100 including a visualization of a second cluster view of a cluster 1310 within a network. The cluster 1310 is highlighted and displayed (e.g., zoomed to). The cluster view can include cluster rank 1320, volume in network 1330 (e.g., size of cluster with respect to total network), number of authors in cluster 1340, overall cluster influence score 1350, and top topics in cluster 1360. The list of top topics 1360 can be ranked according to a feature ranking algorithm described below. The interface 1300 highlights the top influential users (e.g., top three influential users) as indicated at 1370. A graphical object 1380 is included that illustrates which cluster in the top five clusters is being shown.

In another implementation, a spring model can depict the nodes as colored circles and the edges as directed line segments. The shade of the colored nodes can correlate to influence. For example, darker or lighter relative shade can indicate relative influence score. Additionally, color may indicate influence, for example, red may indicate a higher influence than orange or yellow. In addition, cards can be displayed that include, for example, the TWITTER® handle, user bio, and photo for the top six nodes by influence score.

Figure 8:
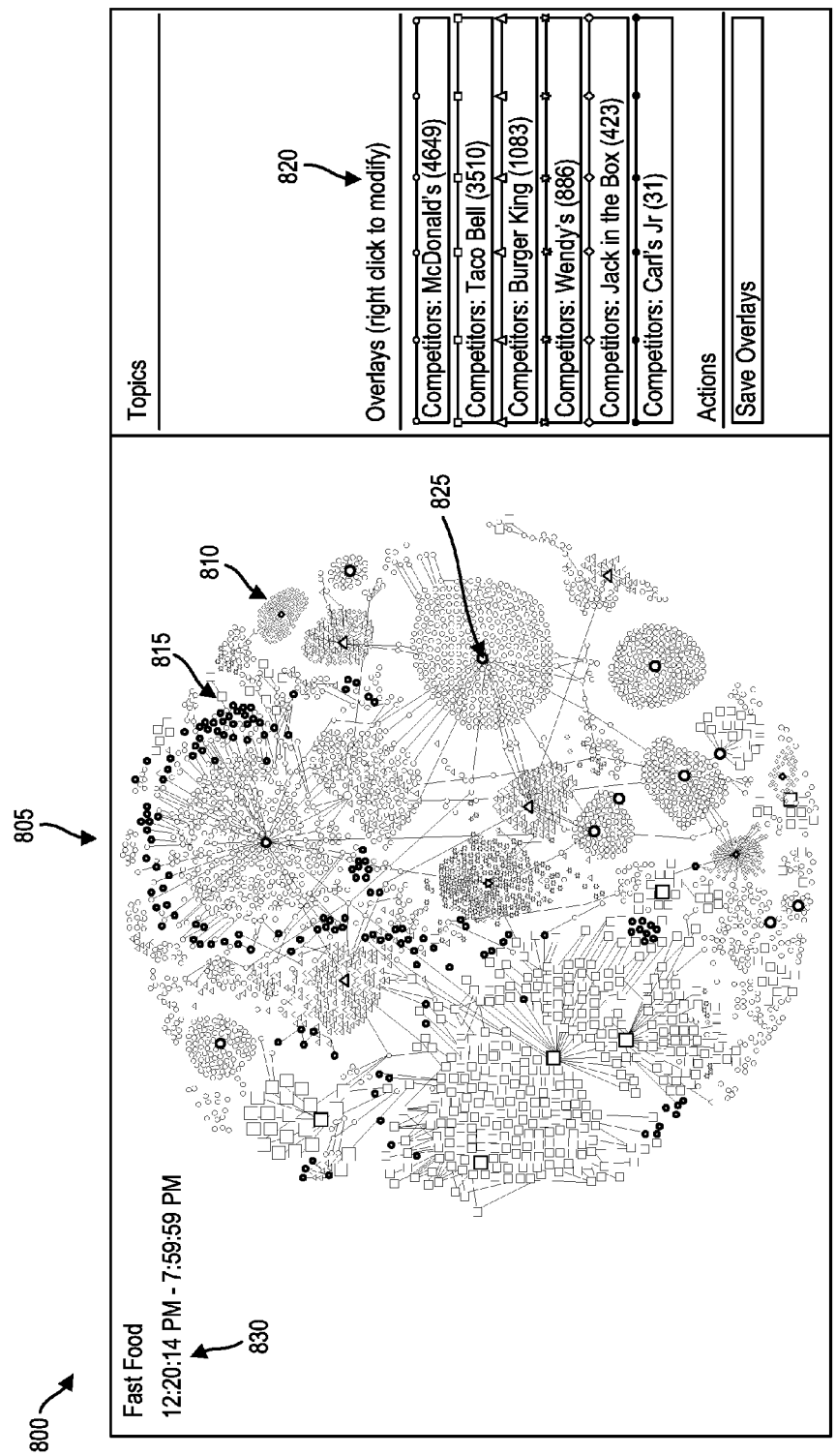
FIG. 8 illustrates an interface depicting a portion of a network and illustrating node influence according to an example implementation of the current subject matter.

FIG. 8 illustrates an interface 800 depicting a portion of a network 805 and illustrating node influence according to an example implementation of the current subject matter. The network 805 is illustrated as a directed graph in a left pane of the interface 800. Each node 810 is illustrated as a circle and each edge 815 is illustrated as a line segment. A search keyword 830 is illustrated in the upper left hand corner of the interface 800 along with a time range of the underlying dataset.

Figure 9:
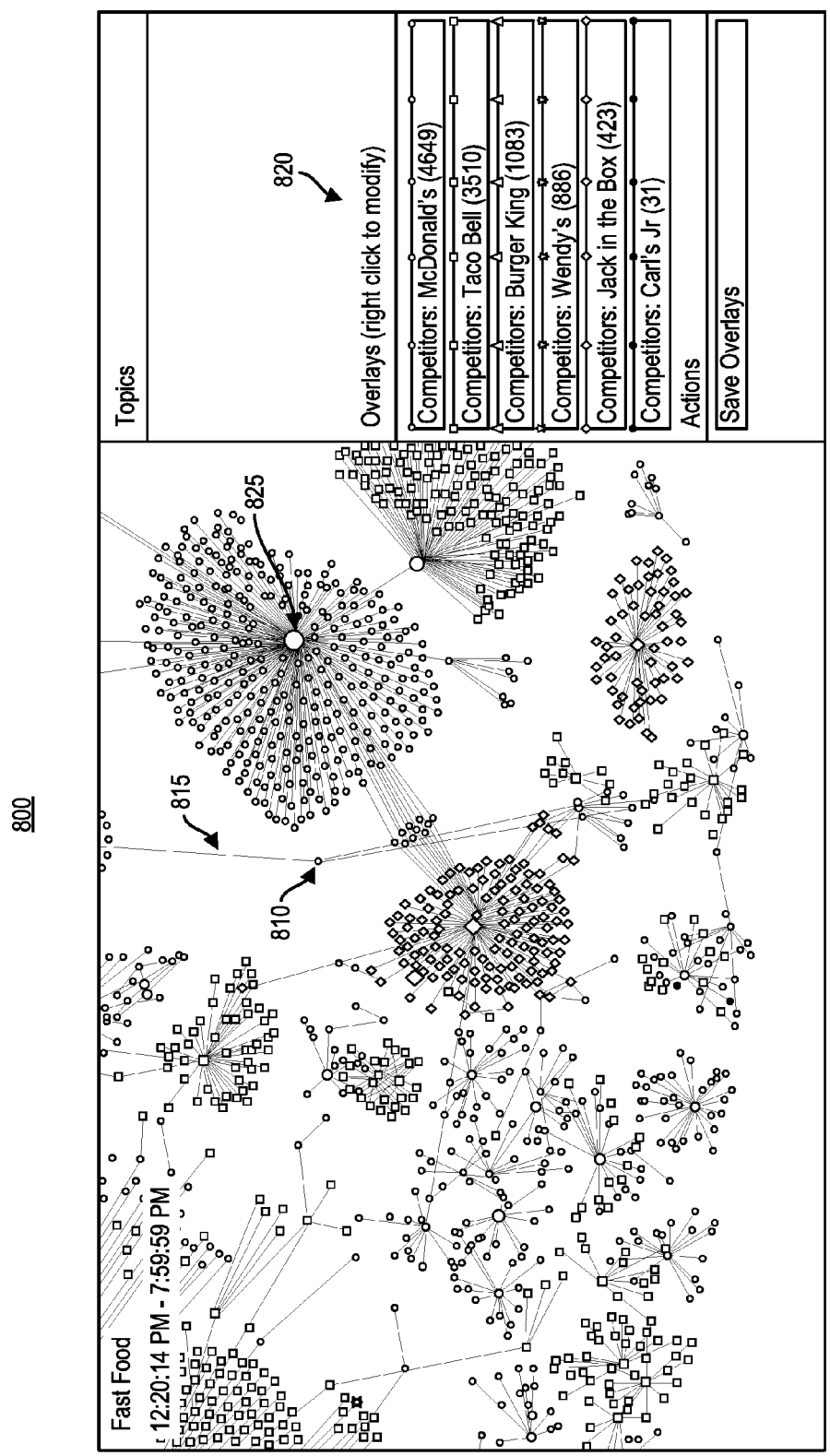
FIG. 9 illustrates interface where a portion of the network is displayed (e.g., the "zoom" on the network is increased)
Figure 10:
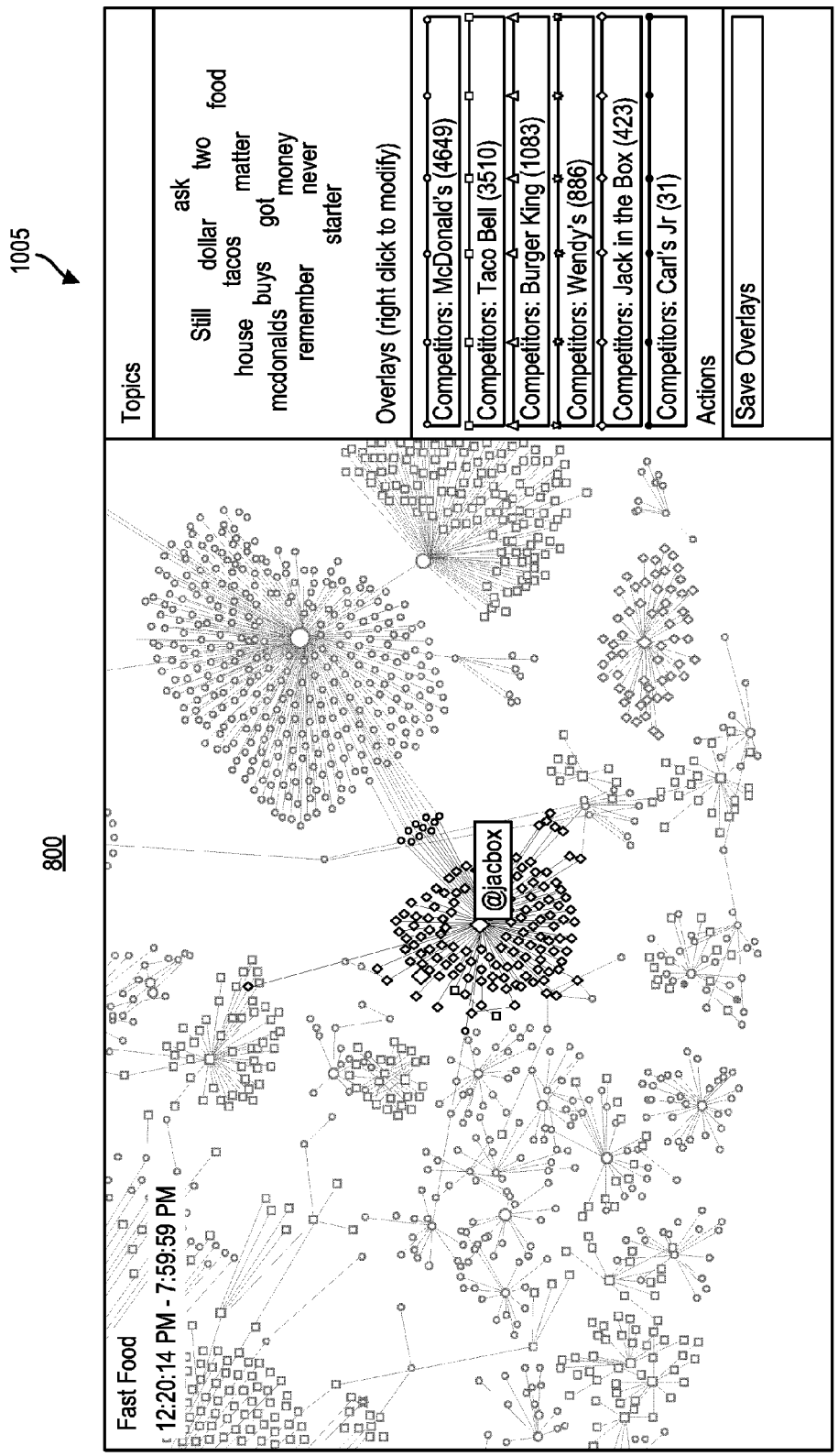
FIG. 10 illustrates the interface as shown in FIG. 9 but with a node selected by the user.

The network 805 can be displayed with color coded nodes. For the purposes of illustration, different node colors are illustrated in the examples of FIG. 8-10 as different node shapes. The nodes can be color coded according to a particular type of association. For example, in the illustrated example, each node is a twitter user and each edge relates to one or more tweets between users about a particular topic. In this case, the topic relates to fast food (e.g., tweets that use "#fastfood" or a variation thereof). The colored overlays can show topics that vary by competitor. In the example, the competitors include McDonald's, Taco Bell, Burger Kind, Wendy's, Jack in the Box, and Carl's Jr. The color coding can be user selectable so that the competitor category overlays can be manipulated according to the user's preference to change color. For example, a user may wish to display nodes relating to Carl's Jr. and Wendy's in the same color. The categories can be displayed in the interface 805 in pane 820.

In some implementations, the directed graph is displayed with color coding according to a relative influence score. For example, nodes with high influence score (for example, an influential node is indicated at 825, are illustrated in a different color (e.g., white) or a different shade, than less influential nodes. Other color or visualization schemes are possible.

FIG. 9 illustrates interface 800 where a portion of the network is displayed (e.g., the "zoom" on the network is increased) and FIG. 10 illustrates the interface 800 as shown in FIG. 9 but with a node selected by the user. As illustrated in FIGS. 9 and 10, when a user hovers a pointer over a node, the node's twitter handle (in the example "@jackbox" is displayed. In addition, when the user selects a given node, any node not participating in the given node's conversation can be shaded. In other words, all nodes in the conversation can be indicated.

In addition, as illustrated in FIG. 10, features of social interactions between nodes in the directed graph can be displayed according to a relative importance. In the example of FIG. 10, the illustrated feature is a conversation topic. For example, in FIG. 10, when node "@jackbox" is selected, words used in the conversation are shown in a topics pane 1005. Topic words can be displayed with a relative size according to the frequency or relative frequency with which the words are used in the conversation.

In some implementations, a user can view clusters sequentially (e.g., in cluster view). The order of viewing clusters can be determined based on a relative importance of the cluster. The relative importance of clusters can be determined using the influence score of nodes within the cluster. For example, the relative importance of each cluster can be determined as the sum of the influence score of each cluster. A higher relative influence of a cluster can indicate a higher importance of that cluster.

As noted above, features can be included in the network data. Features can include attributes of a user that can be predefined (e.g., gender, interests, profession, and the like) or any attribute of a mention that the user has authored (e.g., topic, hashtag, category, and the like). In some implementations, the features used are topics and hashtags, although any collection of features can be used. For a given feature class (e.g., topics, hashtags) the importance of a given feature (e.g., #analytics) within the feature class (e.g., topics, hashtag) can be determined. Specific features can then be ranked according to importance.

In order to determine relative importance of features, features can be assigned a score. A list of all features can be created (e.g., a list of a hashtags). For each feature, the users who possess that feature can be determined (e.g. the users who used a certain hashtag) to create a set of users. Features whose user sets overlap by more than a certain threshold (e.g., 80%) can be combined. Overlap can be considered as the intersection between sets of users who possess a given feature. Clusters in the network can be determined as described above. For each determined cluster, the overlap (e.g., intersection) between the feature's node (e.g., user) set and the cluster can be computed. Overlap size (e.g., the number of users contained in both the feature set and the cluster set) can be divided by a size of the cluster to obtain a cluster overlap score. A difference between the feature's largest and smallest cluster overlap scores (ranging over all clusters) can be computed. The feature's score can be determined as the difference (between the feature's largest and smallest cluster overlap scores) multiplied by a size of the feature's user set (e.g., the number of users contained in the feature set). A feature score over the whole data network can be determined using the cluster scores, for example, by summing across the cluster scores for each feature.

Feature scores for the whole data set can be used to determine the features in the data set may be interesting to a viewer. For instance, if everybody in the network uses the hashtag "#brandwatch" then that hashtag is probably obvious to the user and so it is not highly ranked.

This feature score is large for common features (e.g., common hashtags), which are popular among some but not all of the clusters in the network. This feature score is small for either uncommon features or features that are distributed uniformly across clusters.

As described earlier, over time the interface can be updated (e.g., periodically) with new data received from the network. Thus, a user can analyze activity on the network over time, which can, for example, provide additional insights into the effectiveness of an advertising campaign or event.

Referring again to FIG. 6, at 640, the data visualizer 240 can received updated network information. At 650, the display can be updated, for example, at regular time intervals configured or selected by the user (e.g. 2 minutes). The display 250 can be updated to present a visual representation of new nodes in the network. In some implementations, new nodes are represented using a different color from known nodes (e.g., displayed as green instead of blue). The dynamic updating and displaying of network data allows the visualization subject matter to react to changes in the structure of a conversation over time, such as the emergence or splintering of a cluster. Further, contextual understanding of conversations over time is enabled.

Figure 7:
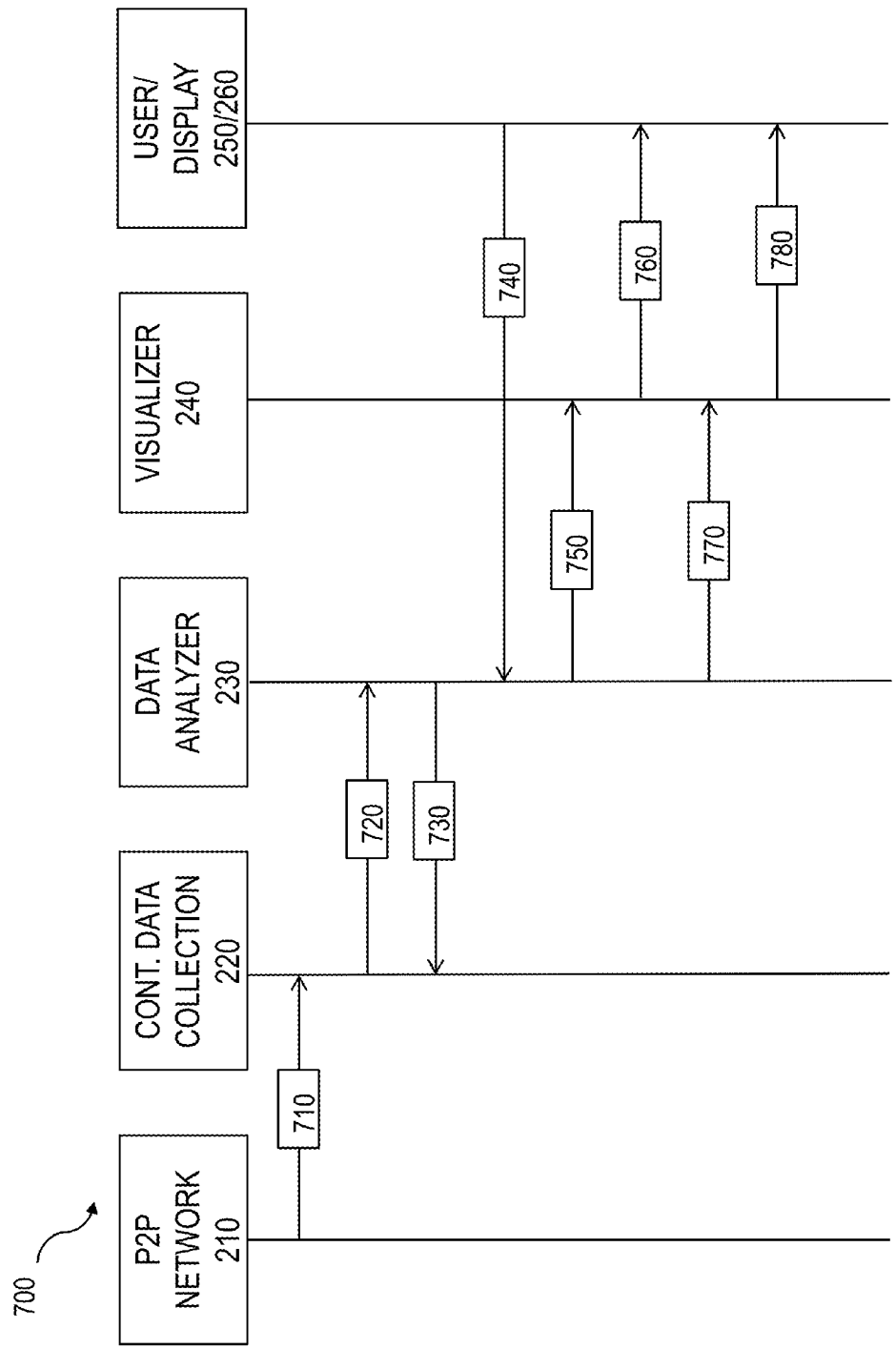
FIG. 7 is a data flow diagram illustrating data flow in the example system of FIG. 2.

FIG. 7 is a data flow diagram illustrating data flow 700 in an example implementation of the current subject matter. At 710, peer-to-peer network 210 sends raw network data to continuous data collection module 220. In some implementations, the raw network data may be considered an ongoing stream of data that is sent and received continuously, periodically, and/or in response to a change in the peer-to-peer social network 210, such as a post or other interaction. In some implementations, continuous data collection module 220 may periodically poll and retrieve raw network data. Continuous data collection module 220 extracts interaction data from the raw network data and provides the extracted interaction data in the form of a directed graph to data analyzer 230. Data analyzer 230 may provide, at 730, an identifier of a node for continuous data collection module 220 to perform further processing (e.g., enrichment). Results may be provided by continuous data collection module 220 to data analyzer 230 as part of the ongoing provision of graph data 720.

At 740 a user 260 (and/or a client) may provide a search keyword to the data analyzer 230. The search keyword may be regarding a topic pertaining to interactions on the network, for example, "brandwatch". At 750, data analyzer 230 can determine and provide to the visualizer 240 nodes, clusters, and node influence scores having interactions related to the keyword. At 760, visualizer 240 can render, in display 250, a visual representation of the nodes, influence scores, and/or clusters.

At 770, data analyzer 230 can determine that the ongoing stream or updating of directed graph data at 720 provides for a change in the network data that affects interactions and/or nodes related to the search keyword. Data analyzer 230 can provide a dynamic update to visualizer 240. At 780, visualizer 240 can dynamically update display 250 to update the visual representation of nodes, influence scores, and/or clusters being displayed to reflect the updated network interaction.

Although a few variations have been described in detail above, other modifications or additions are possible. For example, the current subject matter can analyze networks that emerge from e-mail and messaging services such as SLACK®. It can be used to study relationships which aren't strictly "social"—for instance, the current subject matter can be used to study a network whose nodes represent people who appear in news articles and whose edges represent co-occurrence (or proximity) in an article.

In another variation, the current subject matter can provide for identification of influential notes associated with certain metadata. In an example implementation where the metadata relates to hashtags (although the meta data can include any type of meta data including professions, interests, gender, and the like), for each hashtag that is used in the gathered data, data analyzer 230 creates a list of all authors who have used that hashtag. Data analyzer 230 sorts the hashtags according to the feature score, (determined as described above). In some implementations, data analyzer 230 can sort hashtags based on the number of authors that have used them, and all but the most frequently used hashtags can be recorded (e.g., the ten most frequently used hashtags). Data analyzer 230 passes these hashtags, together with the lists of authors who have used them, to the visualizer 240 along with the rest of the network data as described above. The user 260 can then be provided with a series of visualizations of relevant clusters, for example, as illustrated and described above with reference to FIGS. 11-13.

In some implementations, the user 260 can be provided with six "overlay" slots. When the user right-clicks on an overlay slot, a menu appears which allows the user to select a hashtag and/or a color. All nodes in the network that have authored a tweet containing that hashtag can be colored according to the user's selection. The user can left-click on the overlay slot to highlight all of these nodes and display a topic cloud based on the relevant tweets. The user can use this feature to identify influential nodes that have used particular hashtags. In this implementation, if the user selects more than one colored overlay, the colors are applied in order from the lowest overlay slot to the highest overlay slot. By left-clicking on the lower overlay slots, the user can then visualize the overlap between hashtags. For example, if the user puts #firsthashtag (colored red) above #secondhashtag (colored green) in the overlay panel then all nodes who have used #firsthashtag will be colored red and all nodes who have used #secondhashtag but not #firsthashtag will be colored green. But when the user clicks on #secondhashtag, all nodes who have used #secondhashtag will be highlighted, and thus the user can infer that any red highlighted nodes used both #firsthashtag and #secondhashtag. For example, FIGS. 8-10 illustrate an example visualization of colored overlays.

The subject matter described herein provides many technical advantages. For example, the current subject matter enables contextual review of social data including measurable quantities like social influence relative to a specific cluster or piece of content. The current subject matter provides localized analysis in that distinct roles played by specific users within a conversation are accounted for. For example, a user who attracts many retweets from a consistent audience could be called an "amplifier", while a user who attracts interaction from multiple different groups could be called a "connector". The presented analysis is dynamic in that it reacts to changes in the structure of a conversation, such as the emergence or splintering of a cluster.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some implementations, the current subject matter can be implemented on a computer or computing system having multiple display output devices. For example, six displays may be arranged each showing a different dataset. A user can display a different cluster on different displays forming the multiple display devices allowing the user to visualize different data sets. In some implementations, the multiple display output devices need not have displays co-located. For example, a first display showing a first data set may be presented, e.g., as part of a desktop computing device while a second display showing a second data set can be presented on a display of a tablet or other mobile device.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving data characterizing a network represented by a directed graph having nodes and edges, the network including an influence score associated with a node, the network associated with a search keyword;
   displaying, in a graphical user interface display space, a portion of the directed graph and influence score;
   dynamically updating the portion of directed graph in response to receiving updated network data;
   determining the influence score;
   determining clusters of nodes from the directed graph and based on the influence score, the clusters of nodes including subsets of the nodes within the directed graph;
   determining a relative importance of the determined clusters of nodes; and
   displaying, in the graphical user interface display space, the determined clusters of nodes in an order based on the determined relative importance;
   wherein at least one of the receiving, displaying, and dynamic updating is performed by at least one data processor forming part of at least one computing system;
   wherein the determining of the influence score comprises:
   assigning the edges in the directed graph respective initial weights;
   determining a total outgoing edge weight for a node in the directed graph, the determining of the total outgoing edge weight including adding initial edge weights for all outgoing edges for the node; and
   determining the influence score, the determining of the influence score including dividing a weight of each incoming edge by the total outgoing edge weight of the node and summing over all incoming edges.

2. The method of claim 1, wherein the influence score is a likelihood that the node can publish a message and persuade other peers.

3. The method of claim 1, wherein the determining of clusters of nodes from the directed graph comprises:
   determining a set of pre-clusters for each node in the directed graph, the set of pre-clusters for a given node including source nodes associated with each incoming edge of the given node; and determining the clusters of nodes as pre-clusters having an overlap that exceeds a predefined threshold, the overlap being a number of nodes shared in common between pre-clusters.

4. The method of claim 1, further comprising displaying ranked features of nodes, wherein nodes in the directed graph are associated with features and determining the ranked features comprises:
 determining, for each cluster, a set of nodes within the cluster that are associated with the feature;
 determining, for each cluster, a feature overlap size based on an intersection between the determined set of nodes associated with the feature and the cluster;
 determining, for each cluster, a cluster overlap score as the determined feature overlap size divided by a size of the cluster;
 determining a difference between a largest determined cluster overlap score and a smallest cluster overlap score; and
 ranking features by the difference multiplied by a number of nodes associated with the feature.

5. The method of claim 4, wherein the feature includes a predefined attribute including gender, interests, profession, topic, hashtag, and/or category.

6. The method of claim 1, wherein the portion of the directed graph is displayed with color coded nodes, the color coding user selectable; and the portions of the direct graph are displayed with color coding according to the relative influence score.

7. The method of claim 1, wherein the nodes are displayed as circular graphical elements and the edges are displayed as line segments.

8. The method of claim 1, further comprising:
 determining a conversation as a grouping of associated nodes within the directed graph.

9. The method of claim 1, further comprising displaying topics of social interactions between nodes in the directed graph according to a relative importance.

10. The method of claim 1, wherein the display is updated periodically.

11. The method of claim 1, further comprising:
 identifying, using the updated network data, one or more nodes in the updated network data that was not previously in the displayed portion of the directed graph.

12. The method of claim 1, further comprising:
 computing, for each node in the directed graph, the influence score by partitioning the network into maximal sets of vertices with a path of edges joining any pair of vertices.

13. The method of claim 1, further comprising:
 determining all nodes in the directed graph that have used the search keyword in an interaction; and
 displaying the determined nodes.

14. The method of claim 1, further comprising:
 normalizing the influence score with a conversation volume measure determined according to a sum of degrees of vertices in a component containing a given vertex.

15. The method of claim 1, further comprising:
 determining a cluster within the directed graph, wherein a cluster is a set of nodes with more internal connections than external connections.

16. A non-transitory computer program product storing instructions, which when executed by at least one data processor of at least one computing system, implement operations comprising:
 receiving data characterizing a network represented by a directed graph having nodes and edges, the network including an influence score associated with a node, the network associated with a search keyword;
 displaying, in a graphical user interface display space, a portion of the directed graph and influence score;
 dynamically updating the portion of directed graph in response to receiving updated network data;
 determining the influence score;
 determining clusters of nodes from the directed graph and based on the influence score, the clusters of nodes including subsets of the nodes within the directed graph;
 determining a relative importance of the determined clusters of nodes; and
 displaying, in the graphical user interface display space, the determined clusters of nodes in an order based on the determined relative importance;
 wherein the determining of the influence score comprises:
 assigning the edges in the directed graph respective initial weights;
 determining a total outgoing edge weight for a node in the directed graph, the determining of the total outgoing edge weight including adding initial edge weights for all outgoing edges for the node; and
 determining the influence score, the determining of the influence score including dividing a weight of each incoming edge by the total outgoing edge weight of the node and summing over all incoming edges.

17. A system comprising: at least one data processor;
 and memory storing instructions, which when executed by the at least one data processor, implement operations comprising:
 receiving data characterizing a network represented by a directed graph having nodes and edges, the network including an influence score associated with a node, the network associated with a search keyword;
 displaying, in a graphical user interface display space, a portion of the directed graph and influence score;
 dynamically updating the portion of directed graph in response to receiving updated network data;
 determining the influence score;
 determining clusters of nodes from the directed graph and based on the influence score, the clusters of nodes including subsets of the nodes within the directed graph;
 determining a relative importance of the determined clusters of nodes; and
 displaying, in the graphical user interface display space, the determined clusters of nodes in an order based on the determined relative importance;
 wherein the determining of the influence score comprises:
 assigning the edges in the directed graph respective initial weights;
 determining a total outgoing edge weight for a node in the directed graph, the determining of the total outgoing edge weight including adding initial edge weights for all outgoing edges for the node; and
 determining the influence score, the determining of the influence score including dividing a weight of each incoming edge by the total outgoing edge weight of the node and summing over all incoming edges.

18. The system of claim 17, wherein the influence score is a likelihood that the node can publish a message and persuade other peers.

19. The system of claim 17, wherein the determining of clusters of nodes from the directed graph comprises:
 determining a set of pre-clusters for each node in the directed graph, the set of pre-clusters for a given node including source nodes associated with each incoming edge of the given node; and determining the clusters of nodes as pre-clusters having an overlap that exceeds a predefined threshold, the overlap being a number of nodes shared in common between pre-clusters.

20. The system of claim 17, the operations further comprising displaying ranked features of nodes, wherein nodes in the directed graph are associated with features and determining the ranked features comprises:

determining, for each cluster, a set of nodes within the cluster that are associated with the feature;

determining, for each cluster, a feature overlap size based on an intersection between the determined set of nodes associated with the feature and the cluster;

determining, for each cluster, a cluster overlap score as the determined feature overlap size divided by a size of the cluster;

determining a difference between a largest determined cluster overlap score and a smallest cluster overlap score; and ranking features by the difference multiplied by a number of nodes associated with the feature.

* * * * *